US010688647B2

(12) United States Patent
Ackerman et al.

(10) Patent No.: US 10,688,647 B2
(45) Date of Patent: Jun. 23, 2020

(54) LAWN AND GARDEN TOOL WITH BOOM HAVING ADJUSTABLE LENGTH AND DETACHABLE BOOM SECTIONS

(71) Applicant: THE TORO COMPANY, Bloomington, MN (US)

(72) Inventors: LaVern L. Ackerman, Eagan, MN (US); Joseph J. LeBrun, Lonsdale, MN (US)

(73) Assignee: THE TORO COMPANY, Bloomington, MN (US)

( * ) Notice: Subject to any disclaimer, the term of this patent is extended or adjusted under 35 U.S.C. 154(b) by 0 days.

(21) Appl. No.: 15/599,615

(22) Filed: May 19, 2017

(65) Prior Publication Data

US 2018/0332766 A1    Nov. 22, 2018

(51) Int. Cl.
*B25F 5/02* (2006.01)
*A01D 34/90* (2006.01)
*A01D 34/82* (2006.01)

(52) U.S. Cl.
CPC .............. *B25F 5/02* (2013.01); *A01D 34/902* (2013.01); *A01D 34/824* (2013.01)

(58) Field of Classification Search
CPC ....... A47L 9/244; H02G 11/00; Y10T 16/473; Y10T 403/32467; Y10T 403/32475; A01D 34/90; A01D 34/10; A01D 34/824; A01D 34/416; A01D 34/001; A01D 34/412; A01D 34/902; A01D 34/4165; B25F 5/02; B25F 3/00; B25F 5/00; A01G 3/086; A01G 3/053; A01G 3/062; A01G 3/08; A01G 3/085; B27B 17/0083; B25G 1/04; B25G 3/12; B25G 3/18
See application file for complete search history.

(56) References Cited

U.S. PATENT DOCUMENTS

| 4,286,675 A | 9/1981 | Tuggle | |
| 4,347,880 A * | 9/1982 | van der Merwe | A01G 3/033 144/24.13 |
| 4,491,184 A * | 1/1985 | Kawaharazuka | F16F 7/108 173/162.1 |

(Continued)

FOREIGN PATENT DOCUMENTS

| EP | 0 703 044 A1 | 3/1996 |
| WO | WO 2005/009110 A1 | 2/2005 |
| WO | WO 2010/025803 A2 | 3/2010 |

OTHER PUBLICATIONS

U.S. Appl. No. 29/592,487, filed Jan. 31, 2017, Dretzka et al.

(Continued)

*Primary Examiner* — Jonathan G Riley
(74) *Attorney, Agent, or Firm* — Mueting, Raasch & Gebhardt, P.A.

(57) ABSTRACT

A lawn and garden tool having a handle, a tool head and an adjustable length boom, wherein the boom includes telescoping first and second boom sections. The tool includes a connector assembly having a lock adapted to selectively lock the boom sections relative to one another at any one of a plurality of telescopic locations. The connector assembly further includes a latch adapted to maintain engagement of the boom sections relative to one another, wherein the latch may be manipulated by an operator to selectively allow separation of the boom sections.

18 Claims, 6 Drawing Sheets

(56) References Cited

U.S. PATENT DOCUMENTS

| | | | | |
|---|---|---|---|---|
| 4,505,040 A * | 3/1985 | Everts | A01D 34/416 | 172/41 |
| 4,596,484 A * | 6/1986 | Nakatani | F16B 7/1454 | 248/188.5 |
| 4,733,471 A * | 3/1988 | Rahe | A01D 34/90 | 30/276 |
| 4,761,092 A * | 8/1988 | Nakatani | F16B 7/1454 | 248/188.5 |
| 4,829,675 A | 5/1989 | Beihoffer | | |
| 4,904,827 A | 2/1990 | Potter et al. | | |
| 4,948,149 A * | 8/1990 | Lin | A63B 61/02 | 403/104 |
| 4,976,031 A * | 12/1990 | Miller | A01G 3/053 | 30/166.3 |
| 5,154,449 A * | 10/1992 | Suei-Long | A47L 9/244 | 248/413 |
| 5,288,161 A * | 2/1994 | Graves | B05C 17/0205 | 15/145 |
| 5,332,266 A * | 7/1994 | Canale | A47L 9/244 | 285/24 |
| 5,417,511 A * | 5/1995 | Warden | F16B 7/1427 | 403/109.5 |
| 5,446,964 A * | 9/1995 | Woods | A01D 34/416 | 30/276 |
| 5,594,990 A | 1/1997 | Brant et al. | | |
| 5,662,428 A * | 9/1997 | Wilson | A01D 34/902 | 172/13 |
| 5,718,050 A * | 2/1998 | Keller | A01G 3/08 | 16/DIG. 12 |
| 5,802,724 A * | 9/1998 | Rickard | A01D 34/90 | 30/276 |
| 5,809,653 A * | 9/1998 | Everts | A01D 34/90 | 15/328 |
| 5,855,069 A * | 1/1999 | Matsubayashi | B25F 5/006 | 30/276 |
| 6,006,434 A * | 12/1999 | Templeton | A01D 34/90 | 30/276 |
| 6,213,677 B1 * | 4/2001 | Yamane | A01D 34/905 | 30/276 |
| 6,260,278 B1 | 7/2001 | Faher | | |
| 6,474,747 B2 * | 11/2002 | Beaulieu | F16B 7/042 | 30/296.1 |
| 6,997,268 B2 | 2/2006 | Smith | | |
| 6,997,633 B2 * | 2/2006 | Thomas | A01D 34/90 | 172/438 |
| 7,066,511 B2 * | 6/2006 | Newman | F16B 7/149 | 294/210 |
| 7,484,300 B2 | 2/2009 | King et al. | | |
| 7,516,988 B2 * | 4/2009 | Lin | A47L 9/244 | 15/414 |
| 7,552,806 B2 * | 6/2009 | Tong | A47L 9/244 | 15/323 |
| 7,584,542 B2 | 9/2009 | Smith | | |
| 7,743,683 B2 * | 6/2010 | Dayton | B25F 3/00 | 173/216 |
| 7,886,509 B2 * | 2/2011 | Itoh | A01D 34/90 | 30/276 |
| 8,079,151 B2 * | 12/2011 | Chen | A01G 3/08 | 15/144.1 |
| 8,136,254 B2 | 3/2012 | Gieske et al. | | |
| 8,272,098 B2 * | 9/2012 | Stewart | A47L 9/246 | 15/414 |
| 8,608,118 B2 * | 12/2013 | Lai | F16B 7/1454 | 248/74.1 |
| 9,198,347 B2 * | 12/2015 | Nagahama | A01D 34/6806 | |
| 9,333,636 B2 * | 5/2016 | Yamada | A01D 34/90 | |
| 9,427,859 B2 * | 8/2016 | Maynez | B25F 5/00 | |
| 9,591,809 B2 * | 3/2017 | Gieske | A01G 3/086 | |
| 2002/0040528 A1 * | 4/2002 | Schofield | A01G 3/083 | 30/249 |
| 2002/0042997 A1 * | 4/2002 | Uhl | A01G 3/08 | 30/382 |
| 2006/0048397 A1 * | 3/2006 | King | A01G 3/08 | 30/296.1 |
| 2007/0000138 A1 * | 1/2007 | Baskar | A01G 3/053 | 30/392 |
| 2009/0008213 A1 * | 1/2009 | Tims | F16B 7/1427 | 192/93 R |
| 2011/0232436 A1 * | 9/2011 | Morabit | A01D 34/902 | 83/13 |
| 2012/0055033 A1 * | 3/2012 | Yamaoka | A01D 34/4166 | 30/276 |
| 2012/0167399 A1 * | 7/2012 | Codeluppi | A01D 34/90 | 30/276 |
| 2013/0142563 A1 * | 6/2013 | Sumi | F16B 7/1418 | 403/109.1 |
| 2013/0175794 A1 * | 7/2013 | Cordes | A47L 9/24 | 285/7 |
| 2014/0208597 A1 * | 7/2014 | Zhou | A01D 34/90 | 30/276 |
| 2014/0208598 A1 * | 7/2014 | Morita | A01D 34/90 | 30/276 |
| 2015/0014985 A1 * | 1/2015 | Cordes | A47L 9/244 | 285/7 |
| 2015/0129273 A1 * | 5/2015 | Miyakawa | A01G 3/033 | 173/213 |
| 2015/0139717 A1 * | 5/2015 | Bukovitz | F16B 7/1454 | 403/109.5 |
| 2016/0021819 A1 * | 1/2016 | Nakano | B25F 3/00 | 30/276 |
| 2016/0088792 A1 * | 3/2016 | Yamaoka | A01D 34/81 | 30/276 |
| 2016/0227694 A1 * | 8/2016 | Bermudez | A01G 3/086 | |
| 2017/0245720 A1 * | 8/2017 | Canale | A47L 9/32 | |
| 2017/0273239 A1 * | 9/2017 | Ota | A01D 34/828 | |
| 2018/0332766 A1 * | 11/2018 | Ackerman | A01D 34/902 | |

OTHER PUBLICATIONS

U.S. Appl. No. 29/601,668, filed Apr. 25, 2017, Dretzka et al.

Toro "17 in. String Trimmer—Curved Shaft; Item No. 51958—317000001 & Up" and "18 in. String Trimmer—Straight Shaft; Item No. 51978—317000001 & Up; Item No. 51978A—317000001 & Up," Operator's Manual. Form No. 3411-851 Rev. A, The Toro Company, Oct. 31, 2016; 26 pages.

Toro "17 in. String Trimmer—Curved Shaft; Model No. 51954—310000001 & Up" and "18 in. String Trimmer—Straight Shaft; Model No. 51974—310000001 & Up," Operator's Manual. Form No. 3365-102 Rev. A, The Toro Company, Jan. 20, 2010; 28 pages.

Toro 13in Cordless Trimmer, Model No. 51488—Serial No. 314000001 and Up and Model 51488T—Serial No. 314000001 and Up, Operator's Manual. Form No. 3379-441 Rev G, The Toro Company, Copyright 2014; 16 pages.

Toro "12in Cordless Trimmer, Model No. 51487A—Serial No. 315000001 and Up, Model No. 51487AT—Serial No. 315000001 and Up," Operator's Manual. Form No. 3388-261 Rev B, The Toro Company, Copyright 2014; 56 pages.

Ryobi "Operator's Manual, 40 Volt String Trimmer, RY40204," Rev:01, Techtronic Industries Power Equipment, 2016; 38 pages.

Greenworks "13 in. 4A Electric String Trimmer 21212" Rev: 03, Greenworks, 2011; 24 pages.

Greenworks "40V Brushless String Trimmer 2100202," Rev: 00, Greenworks, 2014; 22 pages.

Toro "17 in. String Trimmer—Curved Shaft; Model No. 51955—311000001 & Up" and "18 in. String Trimmer—Straight Shaft; Model No. 51975—311000001 & Up," Operator's Manual. Form No. 3369-612 Rev. A, The Toro Company, 2011; 84 pages.

* cited by examiner

LAWN AND GARDEN TOOL WITH BOOM HAVING ADJUSTABLE LENGTH AND DETACHABLE BOOM SECTIONS

TECHNICAL FIELD

Embodiments of the present disclosure relate generally to the field of landscape maintenance equipment and, more particularly, to lawn and garden tools having a boom of adjustable operating length and detachable boom sections.

BACKGROUND

The landscape maintenance field involves a wide range of lawn and garden tools used to maintain flora and man-made surfaces. For example, powered hand-held snow throwers such as the Power Shovel, manufactured by the Toro Company of Bloomington, Minn., USA, are commonly used to remove snow from walkways and driveways. Additionally, powered debris blowers allow debris clearance using a fast-moving stream of air. Other common lawn and garden tools include the pole saw and hedge trimmer, both of which may be used to trim or modify the natural growth of trees and landscape plants. Perhaps among the most common lawn and garden tools is the string trimmer. String trimmers are typically used to cut grass in areas where it is otherwise prohibitive to use a mower (e.g. where the mower is unable to effectively reach the grass intended to be cut).

While most lawn and garden tools are well-suited to a variety of different users, some may find certain tools are less comfortable to use than others. For example, a smaller user may find that a string trimmer that utilizes a shorter boom is easier and/or more comfortable to operate than a similar trimmer with a longer boom. Yet further, a trimmer having a shorter boom may also allow for more compact storage.

SUMMARY

It is therefore desirable to provide a lawn and garden tool with an adjustable length boom so that it can accommodate a range of operator heights and preferences. Furthermore, it is desirable to have a lawn and garden tool that partially disassembles or folds into a shorter overall length for storage and/or transportation.

One aspect of the present disclosure relates to a lawn and garden tool comprising a handle, a tool head and an adjustable length boom. The adjustable length boom extends between the handle and the tool head. The boom comprises a first boom section comprising a first end connected to the handle and a second boom section comprising a first end connected to the tool head. The second end of either the first or second boom section is telescopically received within a second end of the other of the first or second boom section. A connector assembly may secure the first boom section to the second boom section. The connector assembly comprises a lock and a latch. The lock is positioned at or near the second end of one or both of the first or second boom sections. The lock is adapted to selectively lock the first boom section relative to the second boom section at any one of a plurality of telescopic locations. The latch is attached to either the first or second boom section and is movable between a first position, wherein the latch prevents separation of the first boom section from the second boom section, and a second position, wherein the latch allows separation of the first boom section from the second boom section.

In another aspect, the present disclosure relates to a lawn and garden tool comprising a handle supporting a power source, a tool head supporting a motor operably connected to a rotatable cutting head, and a variable length boom extending between the handle and the tool head. The boom comprises a first boom section comprising a first end connected to the handle, and a second boom section comprising a first end connected to the tool head and a connector assembly. A second end of either the first or second boom section is telescopically received within a second end of the other of the first or second boom section. The connector assembly is adapted to secure the first boom section to the second boom section. The connector assembly comprises a collet attached to the second end of the first boom section, a compression sleeve movable along the second boom section, and a latch attached to either the first or second boom section. The latch is movable between a first position, wherein the latch prevents separation of the first boom section from the second boom section, and a second position, wherein the latch allows separation of the first boom section from the second boom section.

In still another aspect, the present disclosure relates to a method of assembling, adjusting and disassembling a lawn and garden tool. The method comprises assembling a first boom section with a second boom section, wherein the first boom section comprises a first end connected to a handle, and the second boom section comprises a first end connected to a tool head. A second end of either the first or second boom section is telescopically received within a second end of the other of the first or second boom section. A distance between the handle and the tool head is adjusted by telescopically sliding the boom sections relative to one another. The method further provides securing the first boom section relative to the second boom section using a connector assembly. The connector assembly comprises a lock attached to the second end of one or both of the first or second boom sections and a latch attached to either the first or second boom section. The method provides engaging the lock to fix a position of the second boom section relative to the first boom section, disengaging the lock to allow telescopic movement of the second boom section relative to the first boom section, and sliding the first and second boom sections away from one another. The method further includes moving the latch from a first position, wherein the latch prevents separation of the first boom section from the second boom section; to a second position, wherein the latch allows separation of the first boom section from the second boom section. The method also provides separating the first boom section from the second boom section.

BRIEF DESCRIPTION OF THE DRAWING

Embodiments of the present disclosure will be described hereafter in the Detailed Description, taken in conjunction with the following drawings, in which like reference numerals refer to like elements or parts throughout, wherein:

FIGS. 5A through 5C are side-elevational views of the apparatus of FIG. 1, illustrating stages of apparatus adjustability, in accordance with embodiments of this disclosure; wherein FIG. 5A illustrates loosening of a lock, FIG. 5B illustrates boom length adjustability and FIG. 5C illustrates securing of the lock to fix the boom length.

Figure 1:
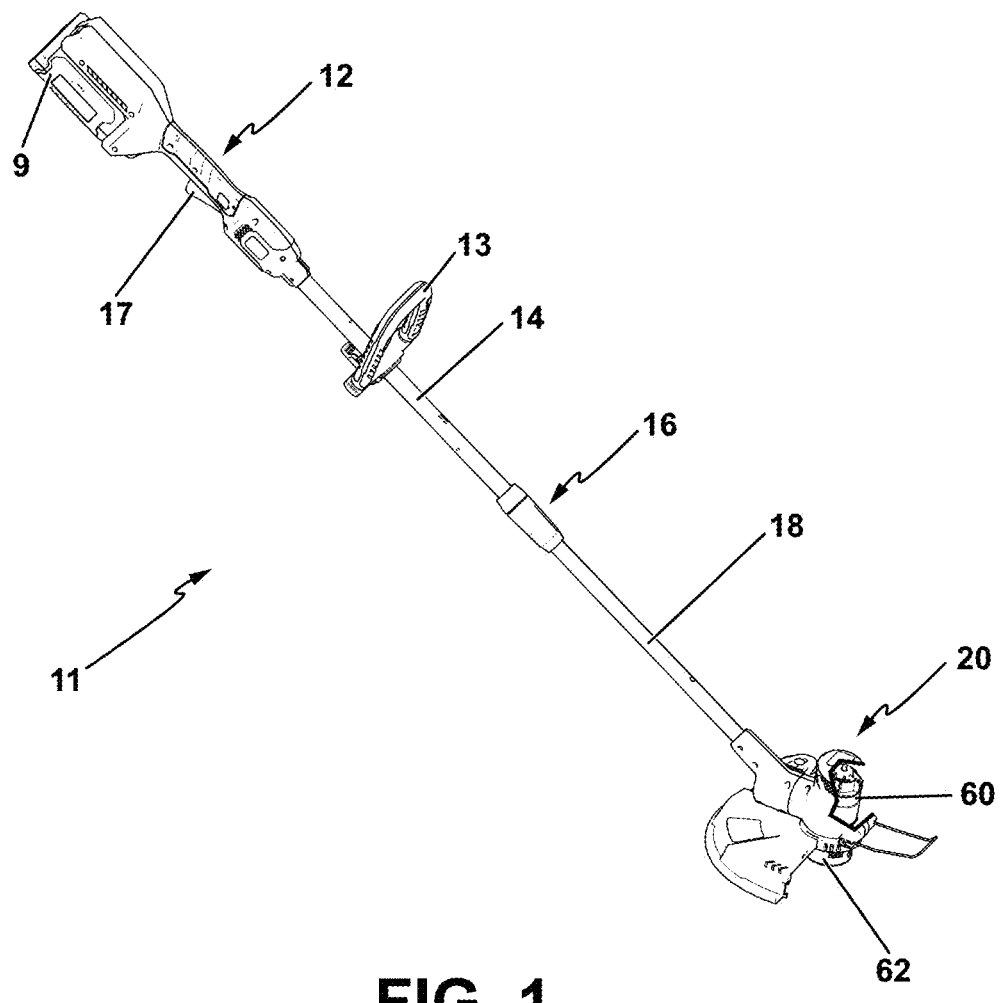
FIG. 1 is a perspective view, partially cut-away, of a lawn and garden tool apparatus (e.g. a string trimmer) in accordance with one embodiment of the disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way. Still further, "Figure x" and "FIG. x" may be used interchangeably herein to refer to the figure numbered "x."

DETAILED DESCRIPTION

In the following detailed description of illustrative embodiments, reference is made to the accompanying figures of the drawing which form a part hereof. It is to be understood that other embodiments, which may not be described and/or illustrated herein, are certainly contemplated.

Embodiments of the present disclosure relate generally to lawn and garden tools (e.g. string trimmer) incorporating an adjustable length boom providing a plurality of operating lengths. Tools in accordance with embodiments of the present disclosure may further provide for disassembly or folding of the boom. Such features may provide a lawn and garden tool with increased utility and convenience.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about."

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the lawn and garden tool while the tool is in a typical operating configuration (see, e.g., FIG. 1.) These terms are used only to simplify the description, however, and not to limit the interpretation of any embodiment described.

With reference to the figures of the drawing, wherein like reference numerals designate like parts and assemblies throughout the several views, FIGS. 1-5C illustrate one exemplary embodiment of a lawn and garden tool apparatus 11 according to this disclosure. Referring to FIG. 1, apparatus 11 is depicted in a typical operating configuration and comprises a handle 12, a first or upper boom section 14, a connector assembly 16, a second or lower boom section 18 and a tool head 20. Tool head 20 comprises a motor 60 which powers a rotatable cutting head 62. Section 14, connector assembly 16 and section 18 collectively function as an adjustable length boom, adapted to alter a longitudinal length of apparatus 11, thereby providing the apparatus with a range of operational positions. For example, FIG. 1 depicts a single operating position, having a first longitudinal boom length, the first position selected from a plurality of possible operating positions each having different longitudinal boom lengths. Handle 12 provides a first location by which the apparatus may be held by an operator during operation. The operator may additionally support the apparatus using a secondary handle 13 positioned at a second location along boom section 14 or boom section 18. Upper boom section 14 and lower boom section 18 are tubular and preferably constructed from a lightweight aluminum alloy, but alternatively, may be constructed from another suitable material such as other metallic alloys or non-metal composites. Boom sections 14 and 18 may each have a first end and a second end, and inner and outer surfaces, defined by respective inner and outer diameters. A longitudinal center axis 15 (see FIG. 4) may extend between the first and second end of each section 14 and 18. Tool head 20 is secured to the first end of boom section 18. The inner diameter of boom section 14 is greater than the outer diameter of boom section 18, which enables boom section 18 to be telescopically received in section 14. Alternatively, boom sections 14 and 18 may have more than one set of inner and outer diameters across longitudinal segments. For example, only the outer diameter at or near the second end of boom section 18 need be smaller than the inner diameter at or near the second end of boom section 14 to permit telescopic connection. Handle 12 is secured to the first end of section 14 and accepts a power source, such as a removable battery 9 or electrical cord (not shown) that supplies power to apparatus 11. Handle 12 further includes a control, e.g., a trigger 17, for actuation of the electric motor 60 of the lawn and garden tool.

Figure 2:
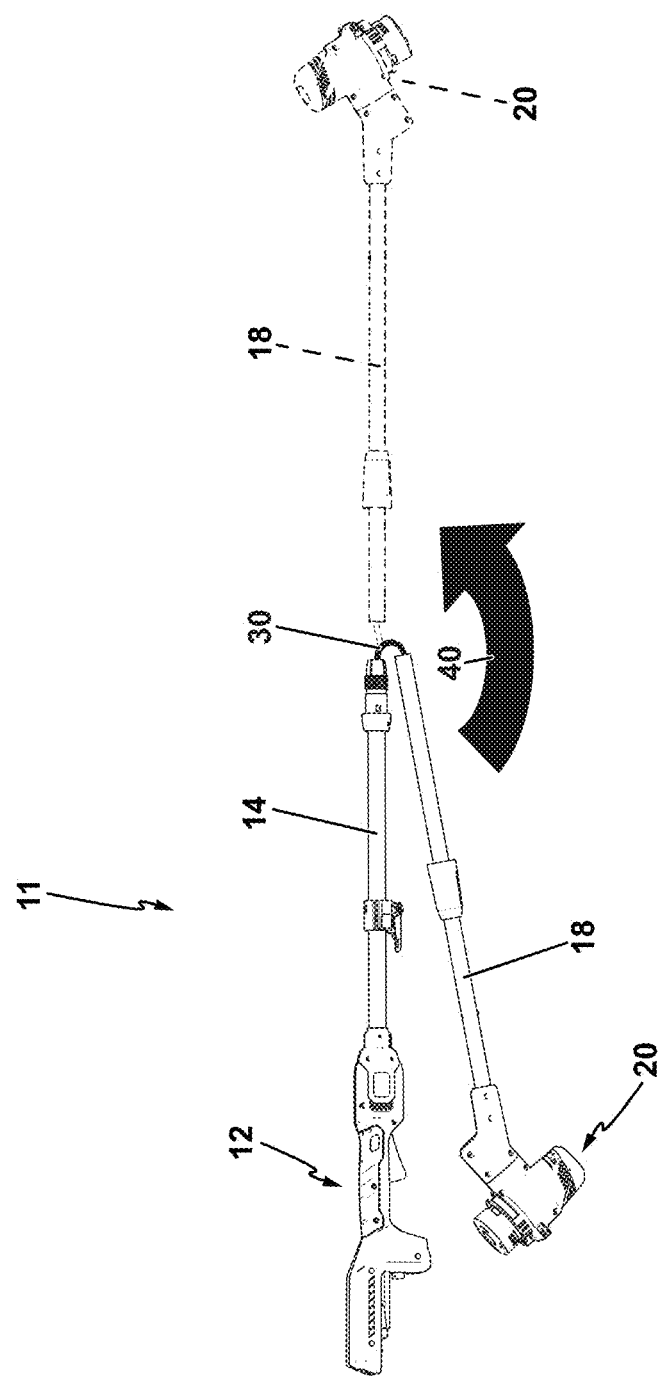
FIG. 2 is a side elevational view of the apparatus of FIG. 1, illustrating a lower boom in both a folded position (depicted in solid line) and a pre-assembly position (depicted in dashed line)

With reference now to FIG. 2, apparatus 11 is depicted in solid lines in a folded or storage position. When apparatus 11 is in the folded position, it has an overall longitudinal length that is shorter than the minimum operational longitudinal length of apparatus 11. For example, whereas the minimum operational longitudinal length of apparatus 11 from the end of tool head 20 to the end of handle 12 (i.e. length measured along longitudinal axis 15) may be 59 inches, a folded longitudinal length from the second end of boom section 14 to the end of handle 12 (again, along axis 15) may be 44 inches. In this folded position, the connector assembly 16 is not engaged (see FIG. 1), and boom sections 14 and 18 are not rigidly secured to each other.

Figure 3:
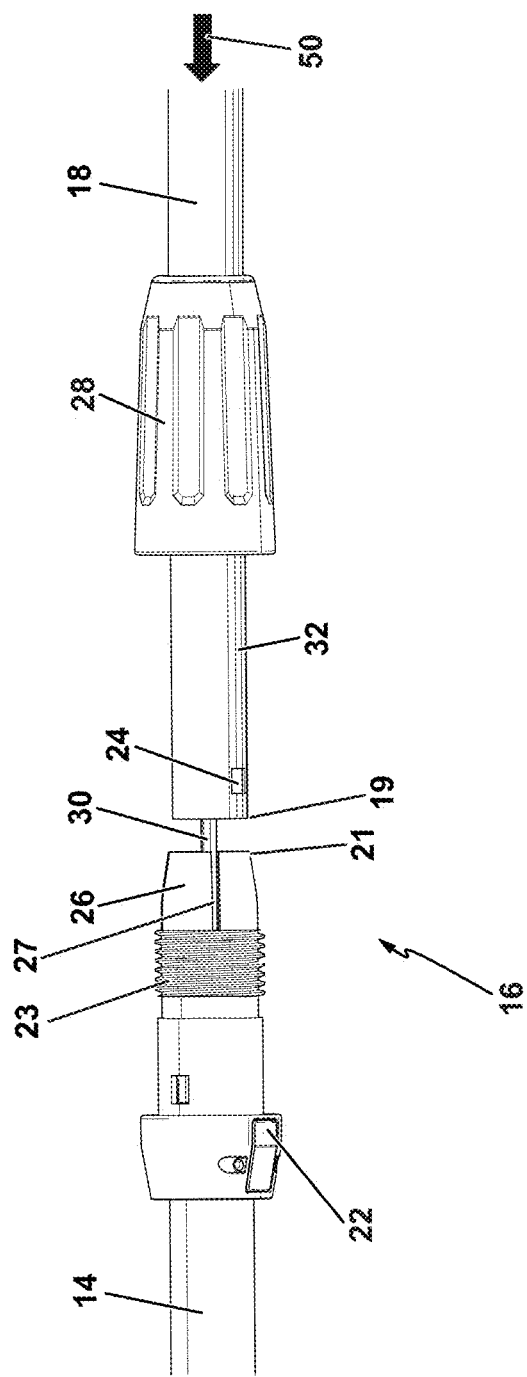
FIG. 3 is an enlarged side elevational view of the apparatus of FIG. 1, illustrating an exemplary connector assembly.
Figure 4:
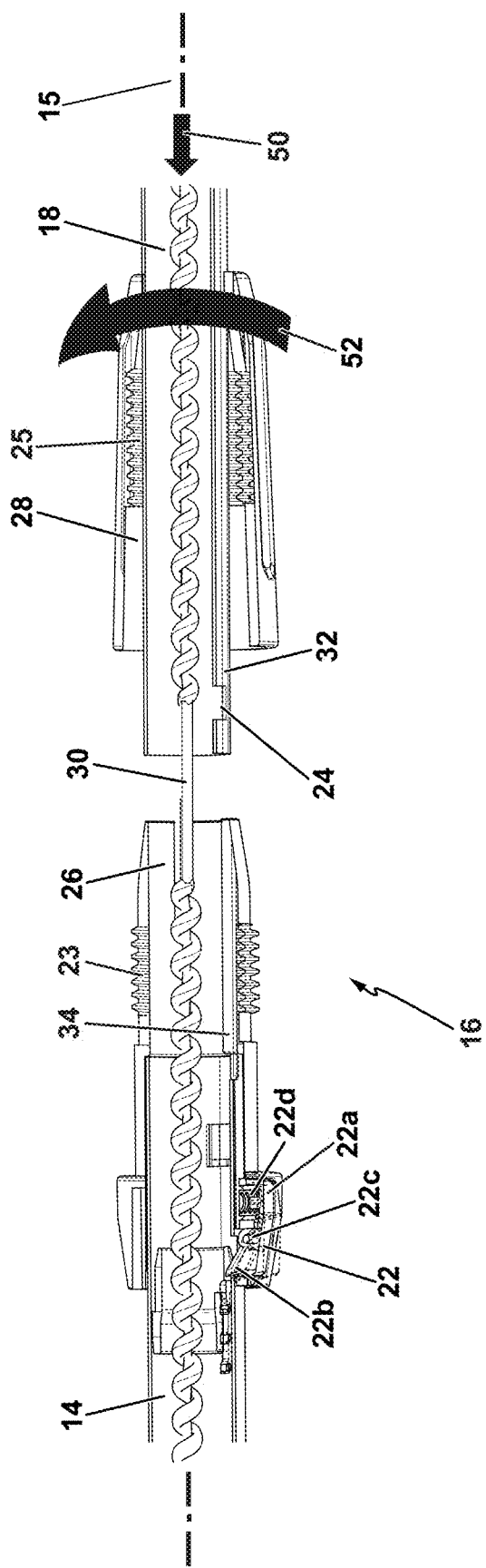
FIG. 4 is a cross-sectional view of the connector assembly of FIG. 3.

A variable-length power supply cable 30 may provide electrical energy from handle 12 to tool head 20 (also shown in FIGS. 3 and 4). Cable 30 may have a portion or portions shaped in a flexible helical coil (see FIG. 4).

In the folded position, handle 12 and tool head 20 are not rigidly secured to each other, but are still flexibly joined via cable 30. Apparatus 11 can be unfolded as boom section 18/tool head 20 move in a path 40 to an assembly position depicted by dashed line in FIG. 2. The dashed line position depicts section 18 in coaxial alignment with section 14, a position required for engagement of assembly 16. Alternatively, boom section 18 and tool head 20 may follow other paths to the assembly position, so long as boom section 18 is ultimately located in coaxial alignment with boom section 14.

FIG. 3 depicts an enlarged view of connector assembly 16. In one embodiment, connector assembly 16 includes a collet 26, a compression sleeve 28, a latch 22, a channel 32 and a receiver 24. Collet 26 and sleeve 28 may together form a lock. As used herein, "latch" refers to any mechanism or device which secures two objects together and requires proactive operator action to separate. Examples of latches include spring latches, cam locks, and ball pin locks. A "receiver" may refer herein to any feature adapted to communicate with the latch. Examples of receivers include an aperture, an opening, a depression, a channel, a notch, a projection, a protuberance, a bump or a ridge.

Channel 32 may be located on the outer diameter of boom section 18 and extend axially from the second end of section 18 towards tool head 20 (not shown). Receiver 24 may be positioned in channel 32, near the second end 19 of boom section 18, as shown. A portion of the inner surface of collet 26 is secured to the outer surface of boom section 14, near its second end 21, opposite of handle 12 (not shown). The outer surface of collet 26 may include a male thread set 23, allowing it to threadably engage with a female thread set 25 (see FIG. 4) on the inner surface of sleeve 28. Collet 26 may be constructed from a polymer and possesses longitudinal slits 27 that improve radial compressibility.

While illustrated and described as a collet 26 and sleeve 28, other lock mechanisms may be used to fix a relative position between boom sections 14 and 18. For example, a cam-lock, flip-lock or twist-expansion-lock mechanism may be used in place of collet 26 and sleeve 28.

FIG. 4 depicts a cross-section view of connector assembly 16. As shown in this view, an alignment spine 34 may be provided and axially positioned on the inner surface of collet 26. Spine 34 may be integrally formed with collet 26, or alternatively, may be a separate component of the same or different material than collet 26.

As further shown in FIG. 4, latch 22 may possess an engagement tip 22b, a lever 22a, a pivot 22c, and a compression spring 22d. Latch 22 is actuated by movement of lever 22a, however, other actuation mechanisms may be utilized. Spring 22d biases tip 22b radially inward towards the longitudinal center axis 15 of boom section 14, as it pivots about pivot 22c, providing a first position for latch 22 (depicted in solid line). Manual depression of lever 22a sufficient to overcome the force exerted by spring 22d will move tip 22b in a radially outward direction, away from the longitudinal center axis 15 of boom section 14, to a second or unlocked position (depicted in dashed line). Rotational securement of boom section 18 to boom section 14 is performed by aligning the outer surface of boom section 18 with the inner surface of the collet 26, aligning spine 34 with channel 32 and telescopically translating boom section 18 into boom section 14 in a direction 50. Further translation of section 18 in direction 50 will result in latch 22 engaging receiver 24, thereby establishing a maximum operational boom length. Latch 22 engages receiver 24, by tip 22b extending radially inward, beyond the nominal depth of channel 32, into receiver 24. Once tip 22b is engaged with receiver 24, boom sections 14 and 18 are no longer separable unless latch 22 is manually actuated.

Application of a force to boom section 18 in direction 50, of a magnitude greater than the combined forces of (1) friction between the outer diameter surface of section 18 and the inner diameter surface of collet 26 and (2) axial force opposite of direction 50 of tip 22b against receiver 24, will cause tip 22b to move radially outward, allowing boom section 18 to translate within boom section 14 in direction 50 as tip 22b translates along channel 32.

In a first position, sleeve 28 is movable along boom section 18 and boom sections 14 and 18 are movable in relation to each other. However, subsequent translation of sleeve 28, along boom section 18, towards collet 26 in direction 50, followed by rotation of sleeve 28 about collet 26 in a direction 52 causes collet 26 to threadably engage with sleeve 28. Eventually this threading engagement, radially compresses collet 26 against boom section 18, providing sufficient frictional force to immobilize boom section 18 in relation to boom section 14. Stated alternatively, sleeve 28 may move to a second position that effectively fixes boom length. Of course, sleeve 28 simultaneously translates in direction 50 as it rotates in direction 52 due to the complementary threads on sleeve 28 and collet 26.

Other locks are also contemplated. For example, a sliding hinge may be used to connect boom sections 14 and 18, with a first end of the hinge secured on boom section 14 and the section end of the hinge connected to boom section 18, with the second end of the hinge capable of sliding in longitudinal relation to boom section 18. Moreover, as described above, embodiments of the present disclosure may permit engagement/actuation of the lock and latch without the use of tools ("tool-less" engagement/actuation). Such a construction allows the operator to quickly and easily adjust/fold the trimmer without first finding the appropriate tool. However, such a tool-less configuration is not limiting as other embodiments may incorporate a lock and/or latch that can be manipulated with the assistance of one or more tools (e.g., wrench, screw driver, etc.).

Figure 5C:
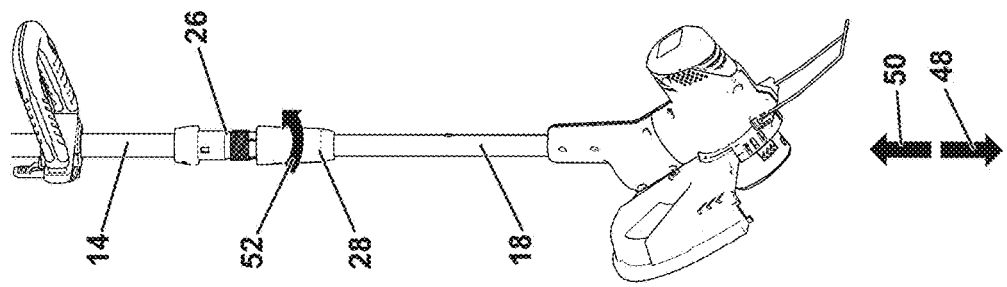
Figure 5B:
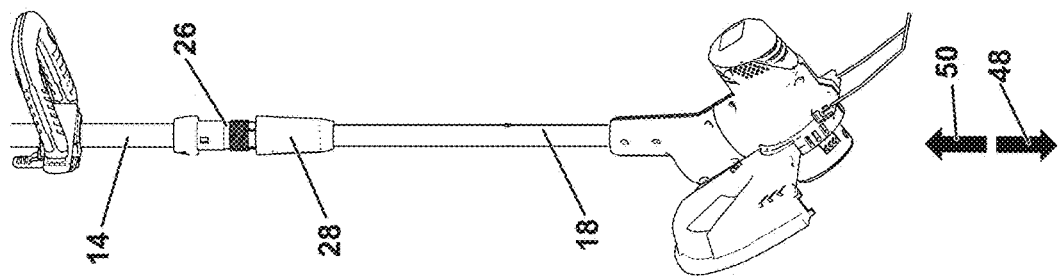
Figure 5A:
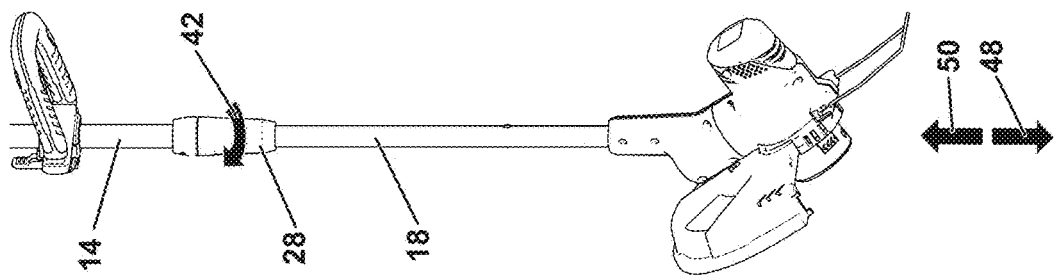

FIGS. 5A, 5B and 5C illustrate stages of boom length adjustment. First to FIG. 5A (depicting a first operational position), sleeve 28 is rotated in a direction 42 to disengage sleeve 28 from collet 26. Sleeve 28 simultaneously translates in a direction 48 as sleeve 28 rotates in direction 42, due to the complimentary threads on sleeve 28 and collet 26. Once sleeve 28 is disengaged from collet 26, as shown in FIG. 5B, the length of the boom may be adjusted by holding boom section 14 and moving boom section 18 in direction 48 to lengthen the operating boom length or moving boom section 18 in direction 50 to shorten the operating boom length. Referring to FIG. 5C (depicting a second operational position), once the desired operating boom length is achieved, the operating boom length may be fixed by sliding sleeve 28 in direction 50 until threads on sleeve 28 threadably engage the complementary threads on collet 26 and rotating sleeve 28 in direction 52, which radially compresses collet 26 against boom section 18 and provides sufficient frictional force to immobilize boom section 18 in relation to boom section 14.

As stated above, apparatus 11 may be disassembled into a folded or storage position as shown in solid line in FIG. 2. To accomplish folding from a fixed boom length position, sleeve 28 is rotated in direction 42 (FIG. 5A) and boom section 18 is moved in direction 48 until the latch 22 engages hole 24 (see FIG. 4). When lever 22a is then actuated through depression, tip 22b moves in an outward radial direction until tip 22b at a greater radial distance from the longitudinal center axis 15 of boom section 18 than the radius of the outer surface of boom section 18. This is the earlier-referenced second position of latch 22. If tip 22b remains at this greater radial distance, boom section 18 can be further moved in direction 48 until collet 26 and section 18 are no longer in direct contact with each other. Once so separated, boom section 18 may be folded against boom section 14 as shown in FIG. 2. These capabilities may enhance the general utility of the lawn and garden tool. That is, the lawn and garden tool may be easily assembled, adjusted and disassembled, allowing the trimmer to occupy a shorter longitudinal length in a folded position than would be possible without disassembly.

Figure 6:
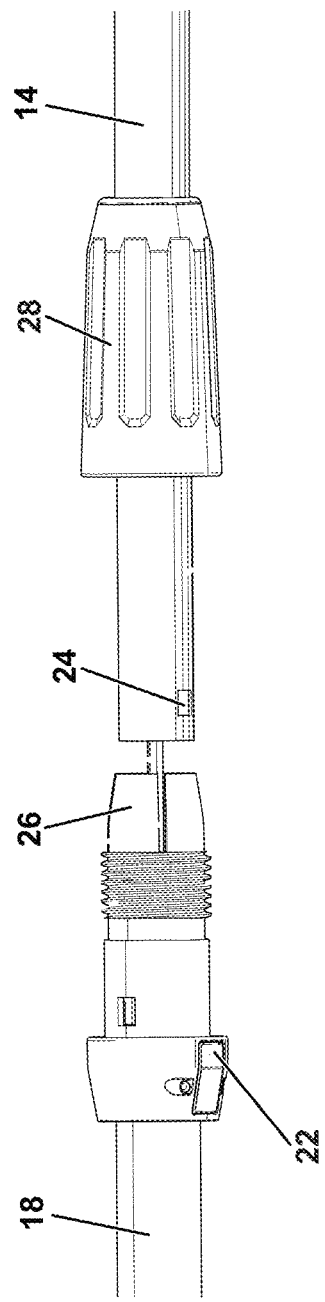
FIG. 6 is an enlarged side elevational view of the apparatus of FIG. 1, illustrating another exemplary connector assembly.

While described with reference to specific embodiments herein, those of skill in the art will recognize that other embodiments are possible. For example, the features of boom sections 14 and 18 may be exchanged. For example, boom section 18 may have a larger inner diameter than the outer diameter of boom section 14, while latch 22 and collet 26 (with spine 34) may be secured to boom section 18, with receiver 24 and channel 32 located on boom section 14 as shown in FIG. 6.

In addition, embodiments of the above disclosure may find applications to other lawn and garden tools, for example gas or electric string trimmers, hedge trimmers, powered hand-held snow throwers, powered debris removal devices and pole saws.

Various modifications of this invention will be apparent to those skilled in the art. Thus, this invention is not limited to the specific details of the embodiments disclosed herein, but only by the appended claims, and equivalents thereof.

The invention claimed is:

1. A lawn and garden tool comprising:
   a handle;
   a tool head;
   an adjustable length boom extending between the handle and the tool head, wherein the boom comprises: a first boom section comprising a first end connected to the handle; and a second boom section comprising a first end connected to the tool head, and further wherein a second end of either the first or second boom section is telescopically received within a second end of the other of the first or second boom section; and
   a connector assembly adapted to secure the first boom section to the second boom section, wherein the connector assembly comprises:
      a lock positioned at or near the second end of one or both of the first and second boom sections, wherein the lock is adapted to selectively lock the first boom section relative to the second boom section at any one of a plurality of telescopic locations; and
      a latch attached to either the first or second boom section, wherein the latch comprises an engagement member engageable with a channel disposed in the other of the first or second boom sections, wherein when the engagement member is engaged with the channel, the first or second boom section is translatable outwardly from the other of the first or second boom section until the engagement member engages a receiver positioned in the channel, and wherein the engagement member is selectively radially disengageable from the receiver to allow separation of the first boom section from the second boom section.

2. The lawn and garden tool of claim 1, wherein the tool head comprises a motor operably powering a rotatable cutting head.

3. The lawn and garden tool of claim 1, further comprising an actuator in communication with the latch, the actuator adapted to selectively disengage the engagement member from the receiver.

4. The lawn and garden tool of claim 3, wherein the actuator comprises a lever disposed on an exterior surface of the first boom section.

5. The lawn and garden tool of claim 1, wherein the lock comprises a collet attached to the second end of either the first or second boom section, and a compression sleeve attached to the other of the first or second boom section, wherein the compression sleeve is movable along the other of the first or second boom section and is threadably engageable with the collet.

6. The lawn and garden tool of claim 5, wherein the compression sleeve is movable, relative to the collet, between: a first boom position, wherein the first boom section is movable relative to the second boom section; and a second boom position, wherein the first boom section is immobilized relative to the second boom section.

7. The lawn and garden tool of claim 1, further comprising a variable-length extension cable passing through the first and second boom sections, the cable electrically connecting the handle to the tool head.

8. The lawn and garden tool of claim 7, wherein at least a portion of the extension cable is helically coiled.

9. The lawn and garden tool of claim 1, wherein the handle supports a power source.

10. The lawn and garden tool of claim 9, wherein the power source is a battery.

11. A lawn and garden tool comprising:
   a handle supporting a power source;
   a tool head supporting a motor operably connected to a rotatable cutting head;
   a variable length boom extending between the handle and the tool head, wherein the boom comprises: a first boom section comprising a first end connected to the handle; and a second boom section comprising a first end connected to the tool head, and wherein a second end of either the first or second boom section is telescopically received within a second end of the other of the first or second boom section; and
   a connector assembly adapted to secure the first boom section to the second boom section, wherein the connector assembly comprises:
      a collet attached to the second end of the first boom section, and a compression sleeve movable along the second boom section; and
      a latch attached to either the first or second boom section, wherein the latch comprises an engagement member engageable with a channel disposed in the other of the first or second boom sections, wherein the engagement member is adapted to engage the channel such that the first or second boom section is translatable outwardly from the other of the first or second boom section until the engagement member engages a receiver positioned in the channel, and wherein the engagement member is adapted to selectively disengage from the receiver to allow separation of the first boom section from the second boom section.

12. The lawn and garden tool of claim 11, wherein the sleeve is adapted to selectively engage the collet and immobilize the first boom section relative to the second boom section when the second boom section is positioned at any one of a plurality of telescopic locations relative to the first boom section.

13. The lawn and garden tool of claim 11, wherein the latch is positioned at or adjacent the second end of the first boom section, and wherein the engagement member is adapted to engage the receiver at or adjacent the second end of the second boom section to prevent separation of the first and second boom sections.

14. The lawn and garden tool of claim 13, further comprising an actuator adapted to selectively disengage the engagement member from the receiver.

15. The lawn and garden tool of claim 11, further comprising an actuator adapted to selectively disengage the engagement member from the receiver.

16. The lawn and garden tool of claim 11, wherein the sleeve comprises a female thread adapted to threadably engage a male thread formed on the collet.

17. The lawn and garden tool of claim 11, wherein the collet defines one or more longitudinal slits adapted to allow radial compression of the collet.

18. A method of assembling, adjusting and disassembling a lawn and garden tool, the method comprising:

assembling a first boom section with a second boom section, wherein the first boom section comprises a first end connected to a handle, and the second boom section comprises a first end connected to a tool head, wherein a second end of either the first or second boom section is telescopically received within a second end of the other of the first or second boom section;

adjusting a distance between the handle and the tool head by telescopically sliding the boom sections relative to one another;

securing the first boom section relative to the second boom section using a connector assembly, wherein the connector assembly comprises:

a lock positioned at or near the second end of one or both of the first and second boom sections and a latch attached to either the first or second boom section, wherein the latch comprises an engagement member engageable with a channel disposed on the other of the first or second boom sections, wherein when the engagement member is engaged with the channel, the first or second boom section is translatable outwardly from the other of the first or second boom section until the engagement member engages a receiver positioned in the channel;

engaging the lock to fix a position of the second boom section relative to the first boom section;

disengaging the lock to allow telescopic movement of the second boom section relative to the first boom section;

telescopically sliding the first and second boom sections away from one another;

moving the engagement member from a position where the engagement member is engaged with the receiver to another position where the engagement member is radially disengaged from the receiver; and separating the first boom section from the second boom section.

\* \* \* \* \*